May 28, 1940.   W. S. MASON   2,202,802
PISTON RING
Filed Dec. 14, 1936
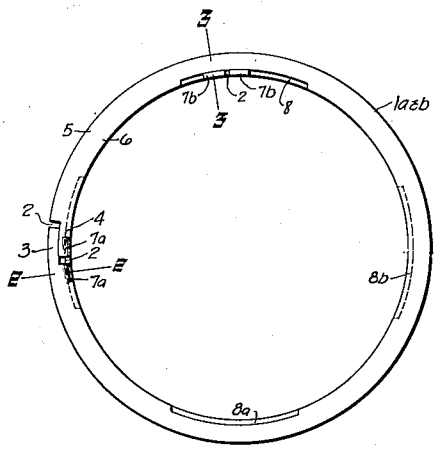
Fig 1
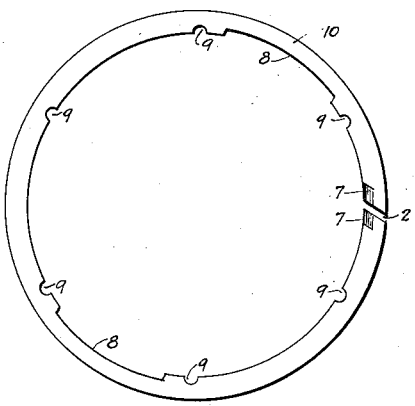
Fig 5
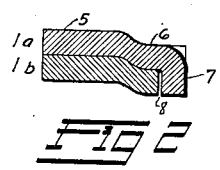
Fig 2
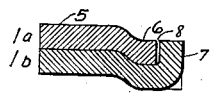
Fig 3
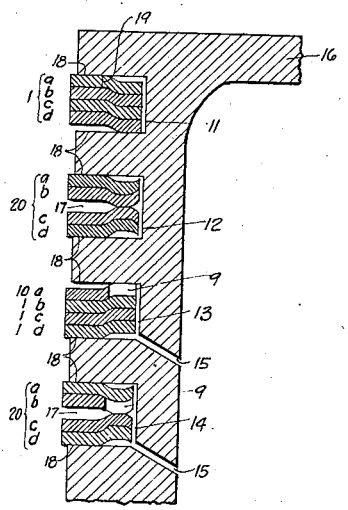
Fig 6
Fig 4   Fig 7
Inventor
William S. Mason
By
Attorney Patented May 28, 1940

2,202,802

UNITED STATES PATENT OFFICE 2,202,802

PISTON RING

William S. Mason, Ocean Beach, Calif.

Application December 14, 1936, Serial No. 115,703

8 Claims. (Cl. 309—24)

This invention relates to metal packings for use in the cylinders of internal combustion engines, and more especially to laminated packings of the axially and radially expansible type.

Some of the many advantages inherent in this type of packing when properly constructed are: long useful life, substantial unbreakability, tendency to conform to the shape of the cylinder wall, and the side walls of the groove in the piston, and a plurality of scraping and sealing surfaces. Despite these advantages and the fact that this type of packing is reasonably cheap to manufacture, it is not widely used, one reason being that they tend to overheat when used in any but the lower grooves in the piston.

Aside from the thinness of the laminations or rings of the packing, some of the principal causes of overheating are: exposure of too much of the side surface of the upper ring of the packing to the direct heat of combustion by its failure to seal the upper side wall of the groove at its periphery, insufficient side surface contact between adjoining rings of the packing, lining up of the gaps of the rings permitting burning gases of the combustion chamber to get behind the rings, and ring drag caused by excessive pressure of the rings on the cylinder wall. This excessive pressure is more noticeable when the rings are wearing in, and is generally due to the method of distortion resorted to to make the rings axially compressible. In some cases the rings are completely distorted and in such manner as to cause the axial pressure of the rings to increase greatly when the rings are compressed radially within the groove by the wall of the cylinder. Therefore it is necessary to fit the rings to the groove with an excess of axial pressure so the rings will retain sufficient pressure to seal the groove laterally when the rings are worn in. This excessive axial pressure is transmitted to the wall of the cylinder and causes excessive ring drag during the wearing in period, and due to the flexibility of the rings some of this pressure is transferred to the ends of the rings causing them to wear excessively.

An important object of the present invention is to reduce the tendency of the above mentioned type of packing to overheat when used in the cylinders of modern high compression internal combustion engines.

Another important object is to provide a packing of the class described in which any excess pressure of the ends of the rings will be transferred to adjoining rings of the packing at a point which will cause the packing to have a more uniform radial expansion than that of an individual ring.

A still further important object is to provide a packing of the type indicated in which the gaps of the rings are overlapped by the side of an adjoining ring and the spaced arrangement of the gaps is maintained without the use of additional means.

Another object is to provide an axially compressible packing of the type indicated formed and arranged to provide free oil drainage between the cylinder wall and the drain ducts in the groove of the piston.

Additional objects and advantages will appear in the specifications and claims below.

Referring to the drawing forming a part of this specification and in which like reference characters are employed to designate like parts:

Figure 1 is a top view of two superimposed rings of my invention,

Figure 2 is a section on the line 2—2 of Figure 1,

Figure 3 is a section on the line 3—3 of Figure 1,

Figure 4 is a sectional view of a single ring,

Figure 5 is a top view of a modification,

Figure 6 is a fragmentary radial section through a piston having four grooves therein and a packing in each groove, and Figure 7 is a sectional view of another modification.

To simplify the description and claims the term packing is used in place of laminated piston ring or other like terms.

One purpose of the present invention is to confine most of the distortion of the rings of the packing when they are compressed between the side walls of the groove to a small portion of their sides, so that radial movement of the rings will have correspondingly smaller effect upon the axial pressure of the packing on the side walls of the packing ring groove than it would if the rings of the packing were completely distorted, and due to this relative independence between the axial and radial expansion it is not necessary to fit the packing to the groove with excessive axial pressure to allow for radial expansion caused by wear on the periphery of the packing. Another advantage of having the distortion confined mainly to a relatively small part of the ring is that the part of the ring under distortion can be located at a point in the side of the ring which would not be subjected to peripheral wear during the useful life of the packing.

Numeral 1 of the drawing indicates a preferred type of ring; 10 indicates one modification; and 20 another modification. When a figure shows several rings they are differentiated by letters. The rings are provided with gap 2. The top ring 1a of Figure 1 shows a preferred type of joint, which is formed by an annularly extending tongue 3 in one end of the ring overlapping in a radial direction annularly extending tongue 4 in the other end of the ring. The outer marginal portion, or land 5 of a ring is in stepped relation throughout the annular length of the ring to the inner marginal portion, or land 6 due to the bent or dished medial portion of the ring. This stepped relation of the marginal portions, or lands is more clearly illustrated in Figure 2 and Figure 3, both of which show how flanges or lugs 7 fit in recess 8 of an adjoining ring. The flanges are formed at the ends of the rings to prevent the ends from getting between the piston and the wall of the cylinder. They are especially important when the rings are used in a badly worn cylinder. They also prevent the joints from lining up.

In Figure 1 of the drawing the recesses 8 are shown to be of sufficient length to permit free annular expansion of the flanges disposed therein, and in their preferred location, which is 90 degrees from the gaps of the rings. When so arranged the ends of adjoining rings will be spaced at right angles, and the flanges of the rings will transfer any excess end pressure to an adjoining ring at a point which will make the radial expansion of the packing more uniform than that of a single ring.

In Figure 5 the ring 10 may be formed by providing either ring 1, or ring 20, with a series of slots 9. These slots extend from the curved portion of the ring through the inner land, and provide radial extending channels between the cylinder wall and the drain ducts in the groove of the piston. This type of ring is useful in combination with unslotted rings in a groove provided with drain ducts. Several methods of utilizing the ring are illustrated in Figure 6. The packing in groove 13, of piston 16, shows one method; the packing is arranged to seal the lower side wall of the groove at its periphery, and slotted ring 10a is placed adjacent the opposite side wall so that the slots 9, of the ring provide oil channels between the side wall and the packing. This method is especially useful in a scored cylinder. Some of the oil which works by the ring on the suction stroke is blown through the slots and the drain ducts in the groove by the combustion leakage during the power stroke. The packing in groove 14 shows another method of using the ring; in this case ring 20b is provided with slots and provides free drainage for oil collecting in channel 17.

In Figure 7 the ring 20 is a modification of ring 1, the essential difference being that in ring 20 the inner land is cupped.

In groove 12, of piston 16, the rings 20 are arranged in two groups, the outer land of the outermost ring of each group being in contact with the adjoining side wall to seal against leakage. The inner lands, or marginal portions of the rings are cupped slightly and so arranged within the groove that the edge of the inner land does not make contact with the adjacent side wall of the groove. This makes the ring especially useful as a replacement ring for use in a worn groove which generally has shoulders and other irregularities. The advantage of the continuous sealed annular channel 17 between the groups and the grouped arrangement is fully described in the copending application of William S. Mason, filed November 25, 1936, and having Serial Number 112,725, now Patent No. 2,111,291, granted March 15, 1938. The packing in groove 11 is a preferred arrangement of the rings when the packing is used in the upper groove of a piston, one reason being that the divergence of the lands of the rings of the packing relative to their dished medial portion is such as to cause the outer land of the upper ring of the packing to seat firmly on the periphery of the upper side wall of the groove so that the minimum of the surface of the packing is exposed to the explosion. This divergence of the lands of the rings before they are compressed between the side walls of the groove 18 is more clearly shown in Figure 4. Another reason is that the adjacent sides of the rings of the packing are in firm and substantially full contact. This forms a good heat path between adjoining rings of the packing. Some additional advantages of the above arrangement are; the overlapping sides of the rings in conjunction with the flanges at the ends of each ring cause the packing to have substantially uniform radial expansion; the distortion caused by compressing the rings between the side walls of the groove centers around the bent portion of the rings, which being medially located in the side of the rings will not be subjected to peripheral wear during the useful life of the packing.

I claim:

1. In combination with an annularly grooved piston, an axially and radially expansible packing, comprising a plurality of resilient divided rings having inner and outer lands diverging from a bent medial portion, the ends of each of said rings being provided with an annularly extending tongue, said tongues overlapping in a radial direction, contact between the adjacent sides of the tongues being in the outer land of the rings.

2. For use in a cylinder in combination with a piston having a packing ring groove provided with drain ducts, a packing comprising a plurality of axially and radially expansible split rings arranged to form annular channels, some at least of said rings being provided with slots, said slots being annularly disposed in the sides of the rings and extending from said annular channels to the bottom of the groove in the piston.

3. For use in a cylinder in combination with a reciprocating piston provided with a packing ring groove, a packing comprising a plurality of superimposed split rings, said packing including a ring provided with a series of slots, said rings being arranged to form an annular channel adjacent to said slotted ring, and said slots being annularly spaced in the side of the slotted ring and extending from said annular channel to the bottom of the groove in the piston.

4. For use in the packing ring groove of a reciprocating piston, an axially and radially expansible packing comprising a plurality of resilient metal split rings, said rings having dished medial portions, and inner and outer marginal portions in stepped relation, and being superposed with the adjacent sides of adjoining rings in substantially full lateral contact.

5. For the purposes described, an axially and radially expansible packing comprising a plurality of superposed relatively thin resilient metal split rings, said rings having flat outer marginal portions, dished medial portions, and cupped inner marginal portions, said marginal portions being in stepped relation, substantially as described.

6. In combination with a piston provided with a packing ring groove, an axially and radially expansible resilient metal split packing ring, said ring having a dished medial portion and inner and outer marginal portions in stepped relation, said dished medial portion being of about the same thickness as said marginal portions.

7. For use in a cylinder in combination with a reciprocating piston provided with a packing ring groove having substantially parallel upper and lower side walls, an axially and radially expansible packing having greater width than and disposed within said groove, said packing comprising a plurality of resilient metal split rings, said rings having dished medial portions extending outwardly from their inner to their outer marginal portions, said dished medial portions being formed and arranged to offset said marginal portions axially, and said marginal portions being inclined relative to said side walls of the groove, and being formed and arranged to be in stepped relation.

8. For use in a cylinder in combination with a piston having an annular packing ring groove therein, an axially and radially expansible resilient metal split packing ring, said ring having its medial portion formed to offset its marginal portions in an axial direction, said medial portion being dished and said marginal portions being in stepped relation, substantially as described.

WILLIAM S. MASON.